United States Patent
Matsubayashi et al.

(10) Patent No.: US 8,365,883 B2
(45) Date of Patent: Feb. 5, 2013

(54) SPLASH GUARD MECHANISM FOR VEHICLE

(75) Inventors: Mikimasa Matsubayashi, Saitama (JP); Chihiro Iida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 12/692,277

(22) Filed: Jan. 22, 2010

(65) Prior Publication Data
US 2010/0187052 A1 Jul. 29, 2010

(30) Foreign Application Priority Data
Jan. 27, 2009 (JP) .................................. 2009-015385

(51) Int. Cl.
*F16D 65/00* (2006.01)
(52) U.S. Cl. ................. 188/218 A; 188/206 R; 280/855
(58) Field of Classification Search ............... 188/218 A, 188/188 R, 18 A, 205 R–206 R; 301/6.8; 280/855–856; D12/180
See application file for complete search history.

(56) References Cited

U.S. PATENT DOCUMENTS

| | | | | |
|---|---|---|---|---|
| 4,005,768 A | * | 2/1977 | Bubnash et al. | 188/218 A |
| 4,473,139 A | * | 9/1984 | Oka et al. | 188/71.6 |
| 2008/0053762 A1 | * | 3/2008 | Nakamura et al. | 188/218 A |
| 2009/0266655 A1 | * | 10/2009 | Mikura et al. | 188/218 A |

FOREIGN PATENT DOCUMENTS
JP 2008-57707 A 3/2008

* cited by examiner

*Primary Examiner* — Robert A Siconolfi
*Assistant Examiner* — Anna Momper
(74) *Attorney, Agent, or Firm* — Birch, Stewart, Kolasch & Birch, LLP

(57) ABSTRACT

A splash guard mechanism for preventing the entry of grass, in addition to mud and gravel, in a vehicle such as a an ATV (All Terrain Vehicle). A disc-shaped splash guard mechanism covers a brake disc stored in a concave portion of a wheel to thereby prevent the entry of dirt such as mud, gravel, and grass into the brake disc. If the dirt enters the brake disc, the dirt is ejected from a first cutout portion provided on a lower portion of the splash guard mechanism. Additionally, a grass removal portion substantially triangle-shaped in plan view is provided on a lower portion of the splash guard mechanism. The grass removal portion protrudes toward a vehicle center to push grass on the ground outward and away from the first cutout portion. Since the grass is only pushed out, the grass is prevented from being cut and entering the brake disk.

14 Claims, 12 Drawing Sheets

SPLASH GUARD MECHANISM FOR VEHICLE

CROSS-REFERENCE TO RELATED APPLICATIONS

The present application claims priority under 35 USC 119 to Japanese Patent Application No. 2009-015385 filed on Jan. 27, 2009 the entire contents of which are hereby incorporated by reference.

BACKGROUND OF THE INVENTION

1. Field of the Invention

The present invention relates to a splash guard mechanism suitable for a brake system for a vehicle, in particular, for an ATV (All Terrain Vehicle).

2. Description of Background Art

Vehicle are equipped with a brake system. In an ATV capable of traveling on an unpaved ground such as dirt or moor, it is necessary to strengthen measures against, particularly, the entry of mud into a brake system. Such measures have been proposed for example, in JP-A No. 2008-57707, see FIG. 11.

A related art will be described with reference to FIG. 11 of JP-A No. 2008-57707. Referring to FIG. 11, dirt (72) such as mud and gravel is deposited on a smallest-diameter portion (32a) of a rim, as shown in FIG. A1 (the bracketed reference signs are those transferred from JP-A No. 2008-57707, hereinafter described in the same manner). The smallest-diameter portion (32a) of the rim is a rotating body, and a brake disc guard (33) is a nonrotating body. A flange (38) extends from the brake disc guard (33) to the near side of the drawing.

When the smallest-diameter portion (32a) of the rim rotates in the direction shown by arrow F, a part of the dirt (72) falls down. The rest of the dirt (72) reaches an upper portion as shown in FIG. B1, and then is scraped off by a scraper (36) in FIG. C1.

The brake disc guard (33) includes a lower portion (41) that is widely cutout. The dirt (72) having fallen down in FIG. 11 sub-FIGS. A1, B1, and C1, is ejected to the far side of the drawing through the large opening of the lower portion (41).

That is to say, JP-A No. 2008-57707 discloses a splash guard mechanism for a vehicle in which the brake disc guard (33) is provided so as to prevent the entry of mud and gravel into a brake disc (30) provided in a wheel, and the lower portion (41) is provided with a cutout so as to easily eject therethrough mud and gravel having entered the brake disc (30).

However, a vehicle such as an ATV may travel on grass. Although grass having entered the brake disc (30) is also ejected through the cutout of the lower portion (41), grass is likely to become tangled therein as compared with mud and gravel. Therefore, the ejection of the grass becomes more difficult. For this reason, the entry of grass into the brake disc (30) is preferably suppressed as much as possible.

SUMMARY AND OBJECTS OF THE INVENTION

Accordingly, an object of an embodiment of the present invention is to provide a splash guard mechanism capable of preventing the entry of grass in addition to mud and gravel in a vehicle such as a an ATV (All Terrain Vehicle).

According to an embodiment of the present invention, a splash guard mechanism for a vehicle, mounted on a brake system stored in a concave portion is provided on each wheel for the wheels to prevent entry of mud from the outside into the brake system. A substantially disc-shaped plate portion covers the brake system to close the concave portion. A first cutout portion is formed by cutting out a lower portion of the plate portion. A grass removal portion extends from the plate portion toward a vehicle center, with at least a portion thereof overlapping with a vehicle front portion of the first cutout portion.

According to an embodiment of the present invention, the grass removal portion is formed in a substantially triangular shape with an apex protruding toward the vehicle center in a plan view. A steep oblique portion having a sharp inclination is provided in the vicinity of the apex on a front oblique side of the substantially triangular shape, and an edge of the front oblique side is bent downward.

According to an embodiment of the present invention, a knuckle is connected to the wheel through a wheel hub. When arm connectors of a suspension are provided on the knuckle, the apex is disposed on a vehicle front side of the arm connectors.

According to an embodiment of the present invention, the substantially disc-shaped plate portion includes a guide portion extending outwardly of the vehicle from the plate portion to guide mud deposited on a rim, and is formed in a C-shape with a portion thereof cutout. The second cutout portion is disposed so as to face the vehicle front side and contains a brake caliper. A front end of the guide portion is disposed above the second cutout portion with the grass removal portion being disposed below the second cutout portion.

According to an embodiment of the present invention, a bent portion, formed by bending downward the edge of the front oblique side, extends to the vicinity of the rim, and a lower edge surface of the bent portion is formed along a bottom surface of the rim.

According to an embodiment of the present invention, the plate portion is provided with the grass removal portion extending toward the vehicle center. Therefore, grass growing on the ground or in water, or the like, can be pushed out toward the vehicle center by the grass removal portion. By the pushing operation, the grass is separated from the first cutout portion of the plate portion. In other words, according to the present invention, it is possible to provide a splash guard mechanism capable of preventing the entry of grass, in addition to mud and gravel, in a vehicle such as an ATV (All Terrain Vehicle).

According to an embodiment of the present invention, while the vehicle travels forward, grass is received by the front oblique side. The grass is pushed toward the vehicle center along the oblique side to be flicked away toward the vehicle center by the steep oblique portion provided in the vicinity of the apex and having a sharp inclination. As a result, the grass is largely away from the first cutout portion. However, some of the grass can immediately return by an elastic action. The returned grass abuts on the rear oblique side to move slowly to the plate portion along the rear oblique side.

In addition, an edge of the front oblique side is bent downward. The bent portion allows an increase in rigidity of the grass removal portion. Further, since the bent portion is provided substantially vertically with respect to the ground, the grass can be readily pushed out.

According to an embodiment of the present invention, the apex of the grass removal portion is disposed on the vehicle front side of the arm connectors of the arms of the suspension. That is to say, the grass removal portion is provided at such a position to avoid interference with the arms of the suspension, thereby allowing enlargement of the grass removal portion and increasing flexibility in shape design.

According to an embodiment of the present invention, the substantially disc-shaped plate portion is formed in a C-shape with a portion thereof cutout, and the second cutout portion is disposed so as to face the vehicle front side and can contain a brake caliper. Also, a front end of the guide portion is disposed above the second cutout portion, and the grass removal portion is disposed below the second cutout portion. Commonly, a rear upper portion of a tire is covered with a fender or the like, and a front portion thereof is open to thereby facilitate access from the outside. Since the brake caliper, the front end of the guide portion, and the grass removal portion are disposed in front of the tire constructed in this manner, the removal of mud and gravel remaining therein without being ejected can be further facilitated.

According to an embodiment of the present invention, a bent portion, formed by bending downward the edge of the front oblique side, extends to the vicinity of the rim, and a lower edge surface of the bent portion is formed along a bottom surface of the rim. With this structure, it is possible to reduce the spacing between the lower edge surface of the bent portion and the rim, and prevent the entry of mud, gravel, and grass into the concave portion of the wheel through the spacing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the accompanying drawings. In the following description, it is to be noted that "front," "rear," "left," and "right" denote directions viewed from the occupant's position, and the drawings should be seen according to the direction of reference signs.

Figure 1:
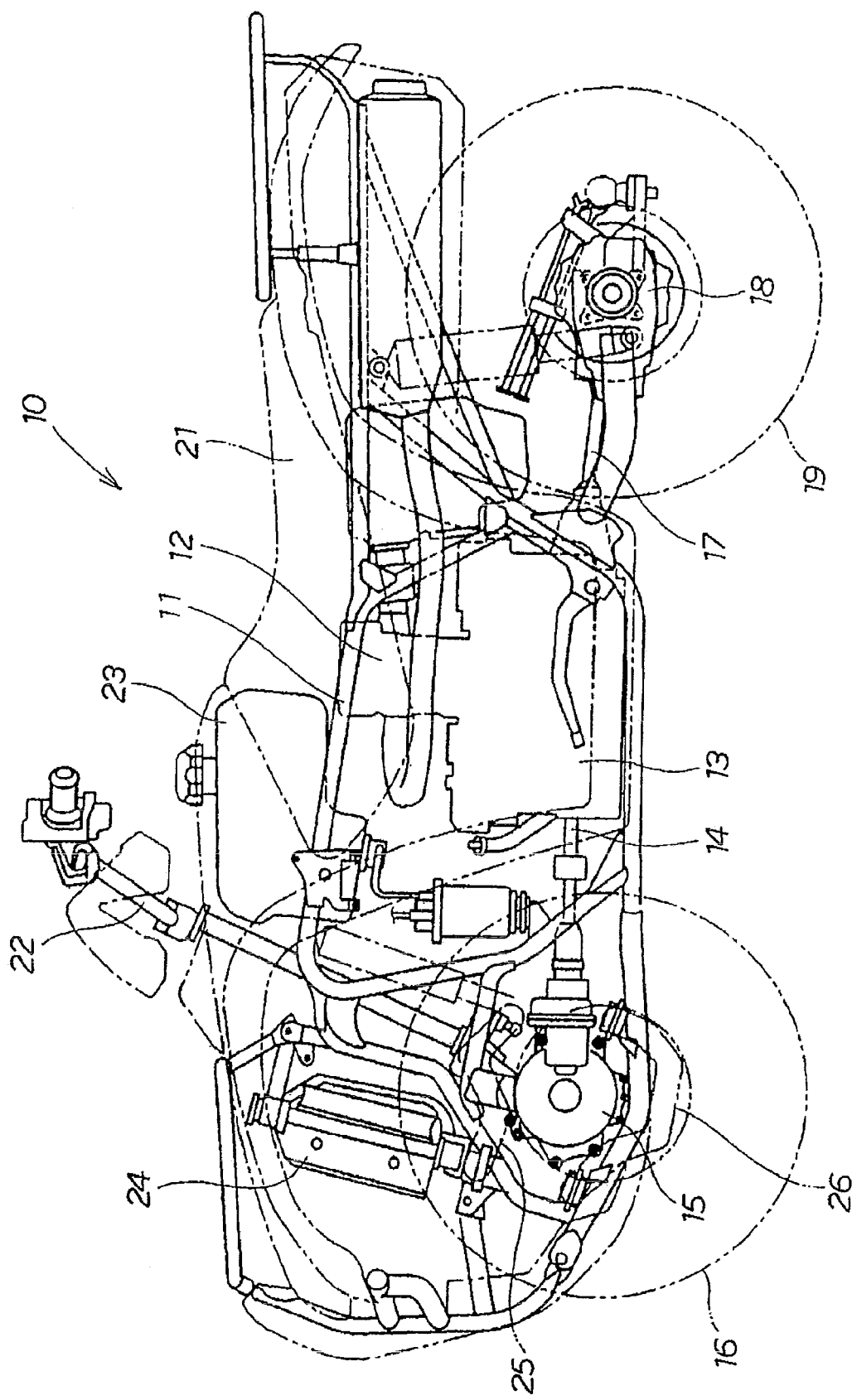
FIG. 1 is a left side view of a vehicle with a splash guard mechanism of the present invention.

FIG. 1 is a left side view of a vehicle with a splash guard mechanism of the present invention. In this embodiment, an ATV (All Terrain Vehicle) is used as an example of a vehicle 10. The vehicle 10 is a four-wheeled vehicle including an engine 12 and a transmission 13 in the center of a body frame 11, driving front wheels 16 through a front gearbox 15 by a front drive shaft 14 extending forward from the transmission 13, and driving rear wheels 19 through a rear gearbox 18 by a rear drive shaft 17 extending rearward from the transmission 13. Also, the vehicle 10 is a saddle-ride type vehicle in which an occupant sits astride a seat 21 disposed on an upper central portion of the body frame 11 to operate a steering wheel 22.

On the body frame 11, a fuel tank 23 is disposed between the seat 21 and the steering wheel 22. Also, a radiator 24 is disposed above the front wheels 16. Each of the front wheels 16 is supported in a vertically movable manner by a suspension including an upper arm 25 and a lower arm 26. A support structure of the front wheels 16 will be described in detail in the next drawing.

Figure 2:
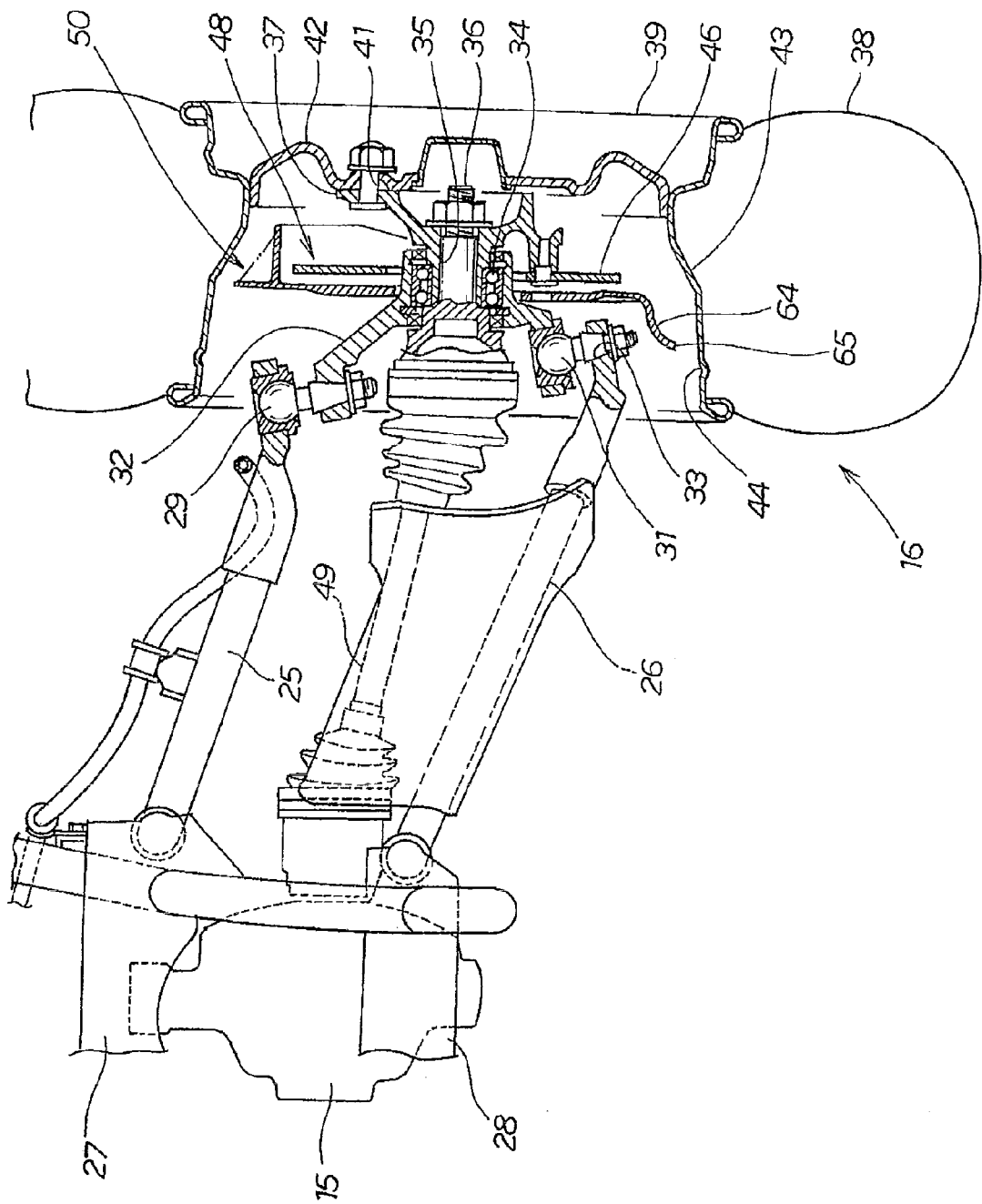
FIG. 2 is a view illustrating the structure of a front wheel and a suspension.

FIG. 2 is a view illustrating the structure of the front wheel and the suspension. The upper arm 25 and the lower arm 26 extend outwardly of the vehicle from cross members 27 and 28 serving as one element of the body frame (body frame 11 in FIG. 1) to be connected to a knuckle 32 through ball joints 29 and 31, respectively. The connecting portion of the ball joint 31 to the knuckle 32 is referred to as an arm connector 33.

A front wheel axle 36 is attached to the knuckle 32 through a bearing 34 and a rotating cylinder 35. Further, the front wheel 16 is attached to a flange 37 extending from a vehicle-exterior side edge of the rotating cylinder 35 by a bolt.

The front wheel 16 is composed of a tire 38 and a wheel 39 for supporting the tire 38. The wheel 39 is composed of a disc 42 having a bolt hole 41, and a rim 43 joined to the outer periphery of the disc 42. The tire 38 is fitted to the rim 43. As is clear from the drawing, the disc 42 is connected to the rim 43 at a position deviating to the vehicle outer side from the center in the vehicle width direction of the rim 43. Therefore, a large concave portion 44 is provided toward the vehicle center from the disc 42.

In the large concave portion 44, a brake system 48 composed of a brake disc 46, a brake caliper (reference sign 47 in FIG. 3) and the like is stored, and a splash guard mechanism 50 covering the brake disc 46 to close the concave portion 44 is disposed. Although the detailed structure of the splash guard mechanism 50 will be described later, the splash guard mechanism 50 is connected to the knuckle 32, and thus, non-rotatable. On the other hand, the brake disc 46 is connected to the flange 37, and therefore rotated along with the front wheel 16 through a constant-velocity joint 49 extending from the front gearbox 15.

Figure 3:
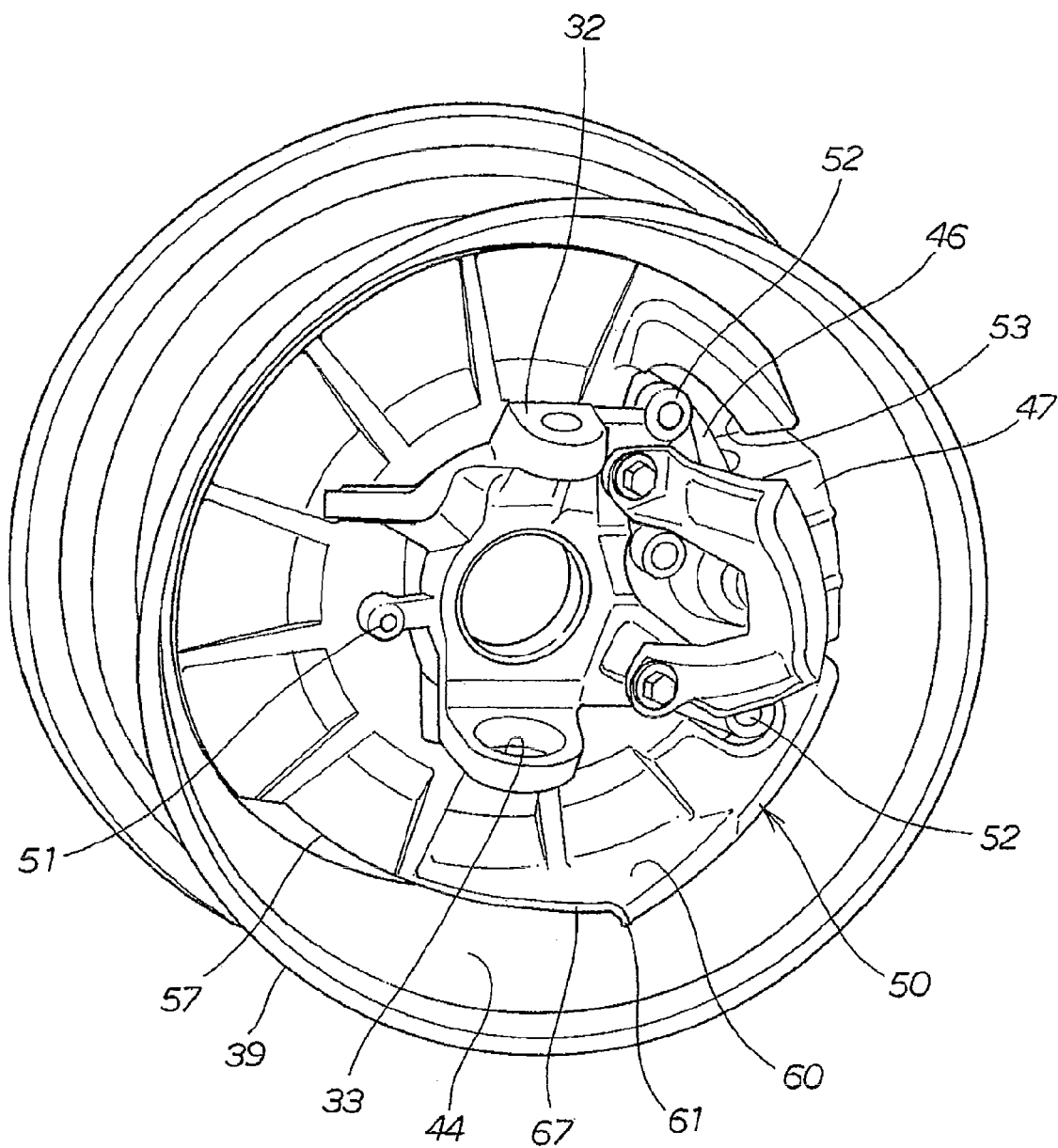
FIG. 3 is a perspective view of a wheel seen from the vehicle center.

FIG. 3 is a perspective view of a wheel seen from the vehicle center. The splash guard mechanism 50, the brake caliper 47, and the brake disc 46 are stored in the concave portion 44 of the wheel 39. A splash guard holder 51 is formed integrally with the knuckle 32, and the splash guard mechanism 50 is held by the splash guard holder 51. Here, a plurality of splash guard holder 51 are formed, however, the other splash guard holder 51 is located behind the knuckle 32 and cannot be seen in the drawing. Also, brackets 52 and 52 extend from the knuckle 32, and the brake caliper 47 is supported by the brackets 52 and 52. The brake caliper 47 is disposed in a second cutout portion 53 provided on the splash guard mechanism 50

Figure 4:
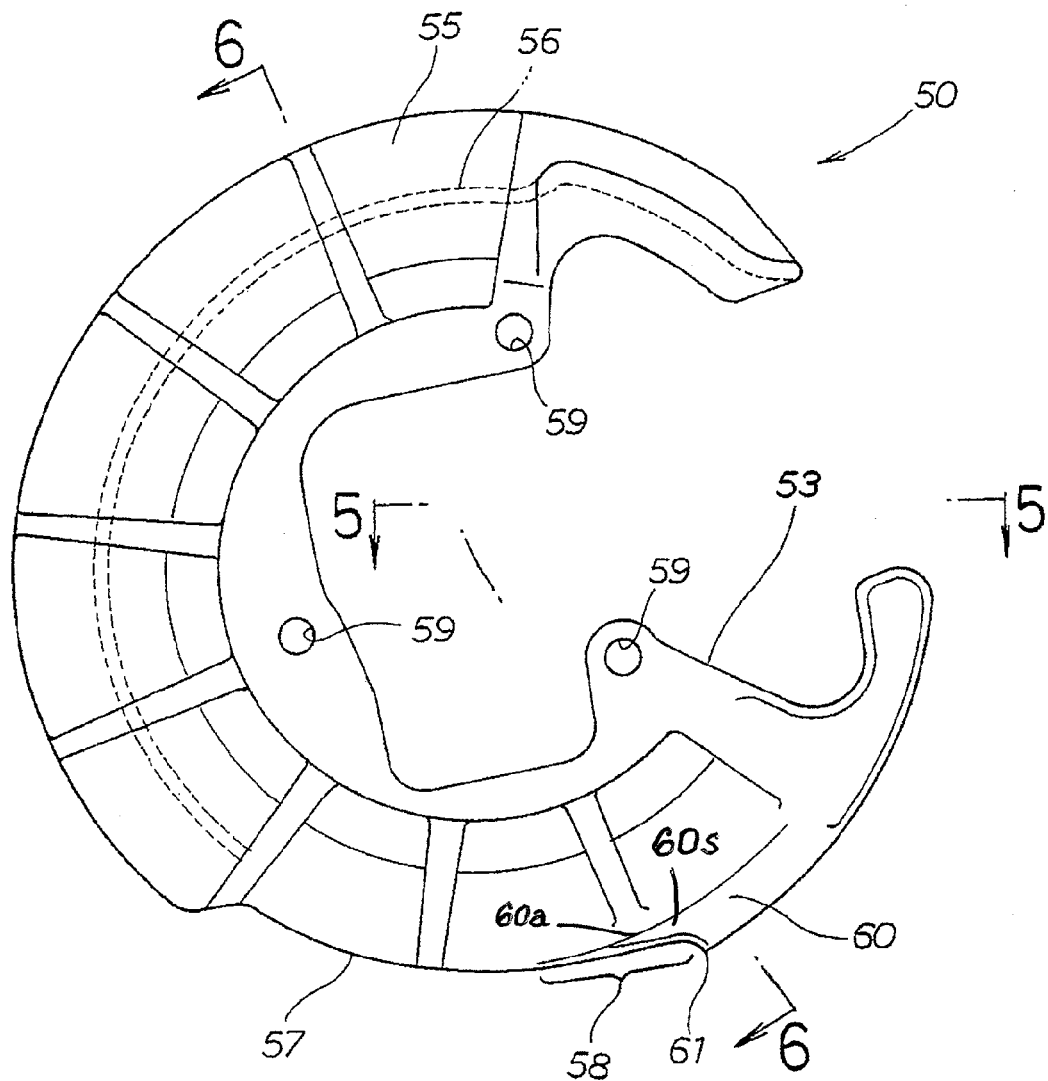
FIG. 4 is a front view of the splash guard mechanism according to the present invention.

Next, the structure of the splash guard mechanism 50 will be described in detail. FIG. 4 is a front view of the splash guard mechanism according to the present invention. When viewed from the vehicle center, the splash guard mechanism 50 is composed of a substantially disc-shaped plate portion 55 including the second cutout portion 53 to be formed in a C-shape. A guide portion 56 extends from the plate portion 55 to the far side of the drawing, that is, outwardly of the vehicle. A first cutout portion 57 is formed by cutting out a lower portion thereof. A grass removal portion 60 extends from the plate portion 55 to the near side of the drawing, that is, toward the vehicle center, with at least a portion thereof overlapping with a vehicle front portion 58 of the first cutout portion 57. The splash guard mechanism 50 constructed in such a manner, is connected to the splash guard holders (splash guard holder 51 in FIG. 3) provided on the knuckle 32 using a plurality of bolt holes 59 (three in this embodiment) arranged so as to surround the large second cutout portion 53.

Figure 5:
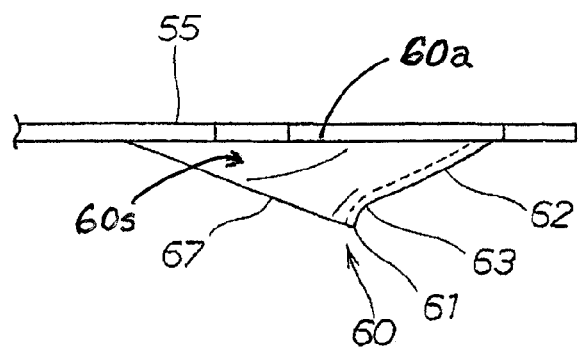
FIG. 5 is a view taken in the direction of arrow 5-5 of FIG. 4.

FIG. 5 is a view taken in the direction of arrow 5-5 of FIG. 4. The grass removal portion 60 is formed in a substantially triangular shape with an apex 61 protruding downwardly in the drawing, that is, toward the vehicle center, in plan view at the forward most part of the first cutout portion. The substantially triangular-shaped grass removal portion 60 has a surface 60s that extends in a direction that is substantially perpendicular to the plate portion 55, and the surface 60s is bounded by a first side 60a extending along a lower edge of the plate portion 55, a rear oblique side 67 extending obliquely rearwardly from the apex 61 to a rear end of the first side 60a and overlapping with a vehicle front portion 58 of the first cutout portion 57, and a front oblique side 62 extending obliquely forward from the apex 61 to a front end of the first side 60. The front oblique side 62 of the substantially triangular shape is provided with a steep oblique portion 63 having a sharp inclination, in the vicinity of the apex 61. A leading edge of the front oblique side 62 is bent to the far side of the drawing, as shown by the dashed line.

Figure 6:
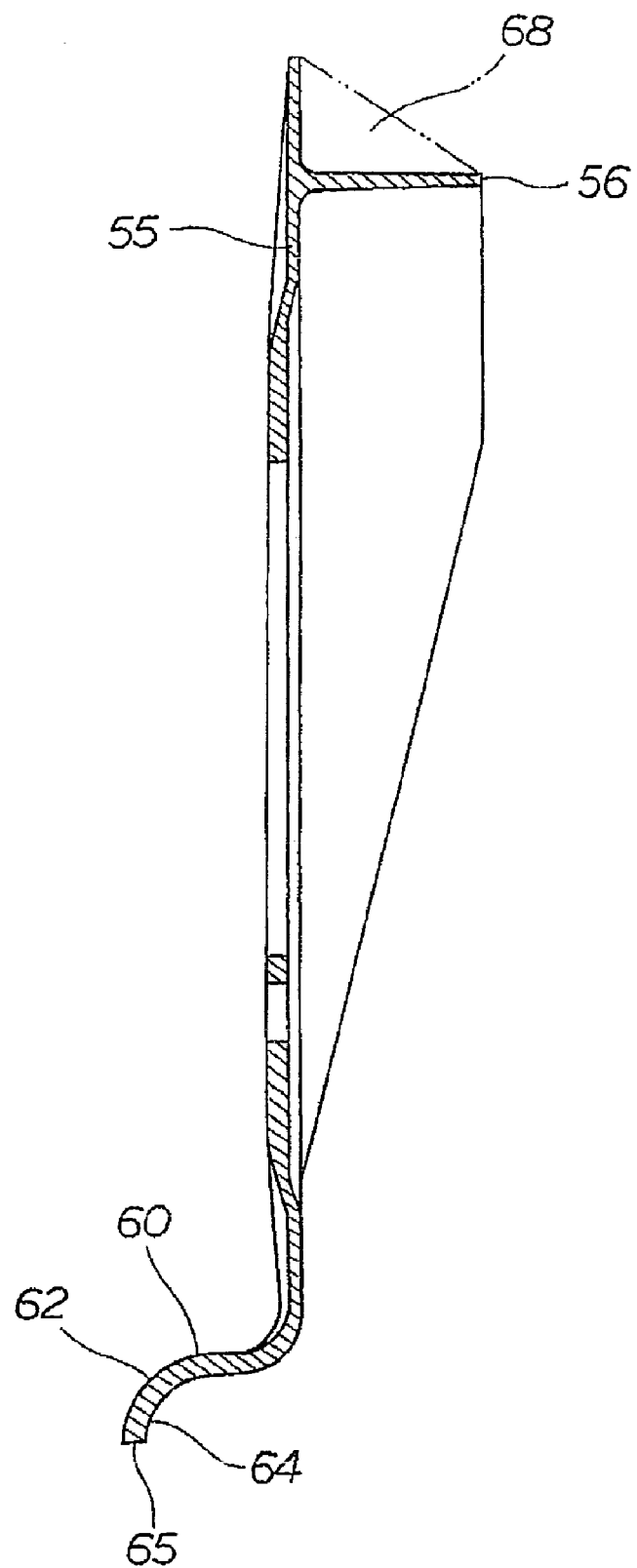
FIG. 6 is a sectional view taken along the line 6-6 of FIG. 4.

FIG. 6 is a sectional view taken along the line 6-6 of FIG. 4. The guide portion 56 extends from the plate portion 55 to the right of the drawing, that is, outwardly of the vehicle. Also, the grass removal portion 60 extends from a lower portion of the plate portion 55 to the left of the drawing, that is, toward the vehicle center. A bent portion 64 is bent from the front oblique side 62 of the grass removal portion 60 thereby to be formed.

Figure 7:
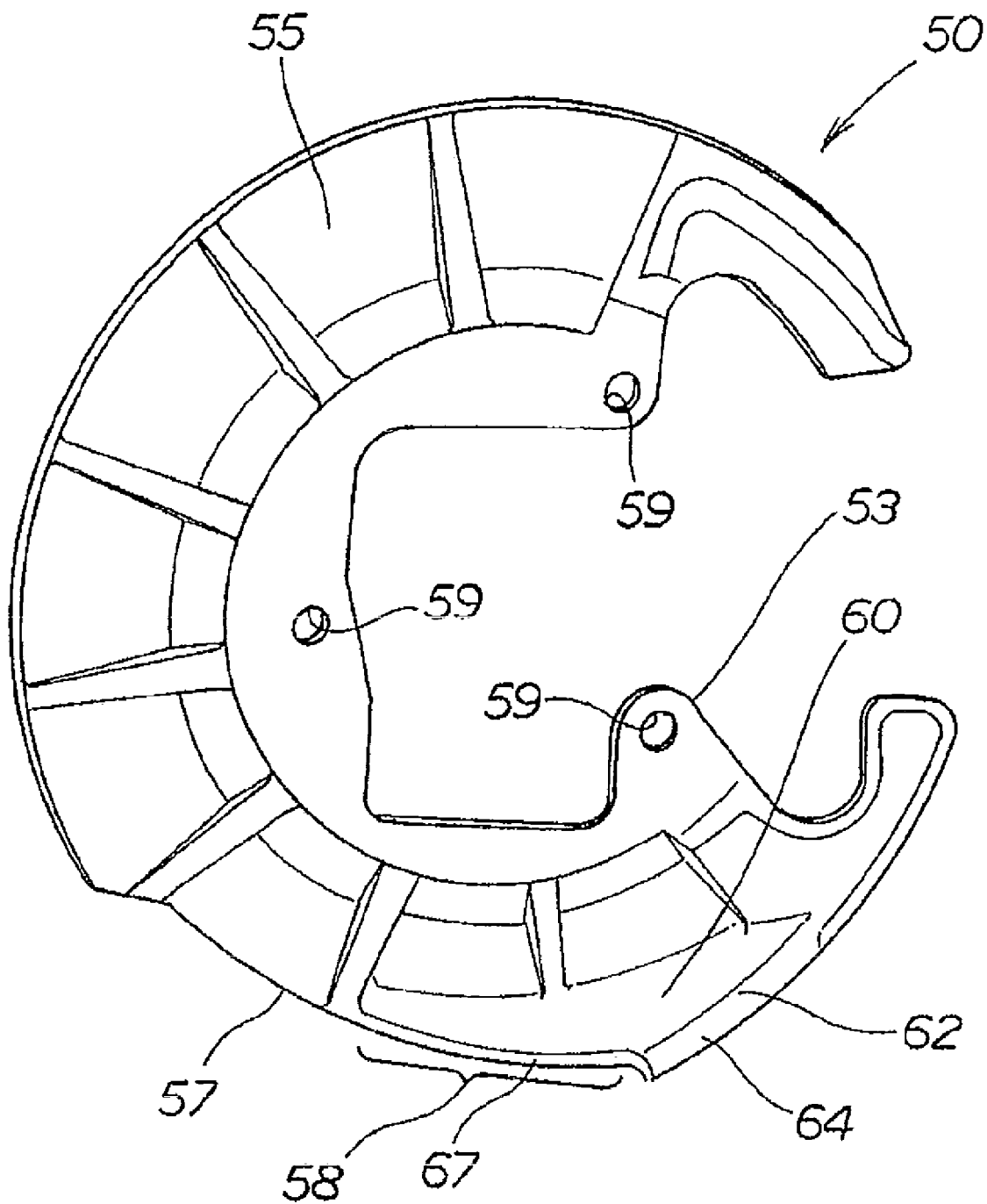
FIG. 7 is a perspective view of the splash guard mechanism according to the present invention.

FIG. 7 is a perspective view of the splash guard mechanism according to the present invention. A rear oblique side 67 of the grass removal portion 60 overlaps with the vehicle front portion 58 of the first cutout portion 57. The grass removal portion 60 constructed in this manner, includes the bent portion 64 formed by bending downward an edge of the front oblique side 62.

Figure 8:
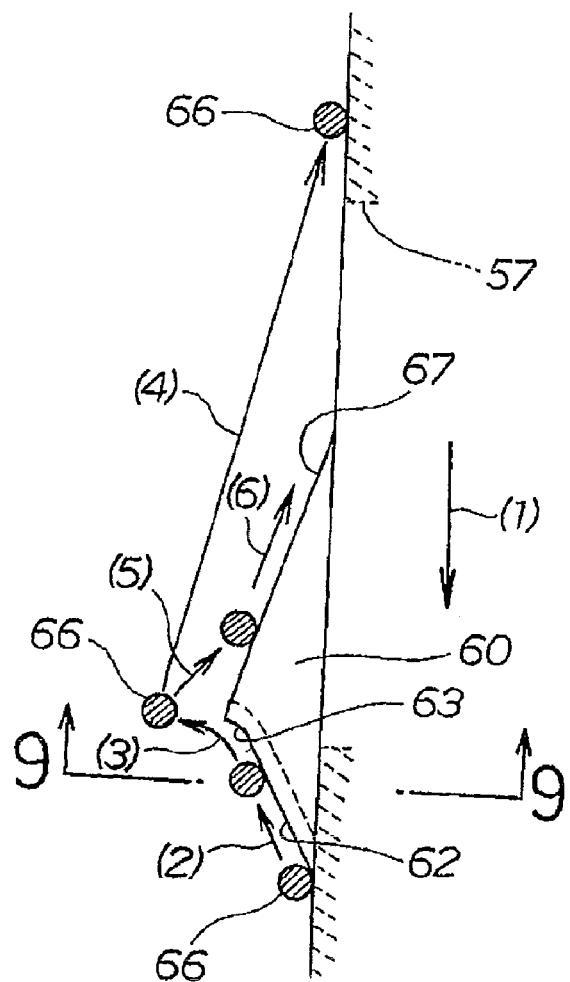
FIG. 8 is a view illustrating the operation of a grass removal portion of the present invention.

FIG. 8 is a view illustrating the operation of the grass removal portion of the present invention. Along with the forward movement of the vehicle, the grass removal portion 60 substantially triangle-shaped in plan view moves in the direction shown by arrow (1). Grass 66 growing on the ground or in water, moves relatively in the direction shown by arrow (2) along the front oblique side 62 to be pushed out in the direction shown by arrow (3), by the steep oblique portion 63. When the grass 66 is not springy, the grass 66 returns slowly in the direction shown by arrow (4). Ideally, the grass 66 outreaches the first cutout portion 57.

When the grass 66 is springy, the grass 66 is immediately returned in the direction shown by arrow (5). Thereafter, the grass 66 moves slowly in the direction shown by arrow (6) along the rear oblique side 67 formed to be gently-inclined. Therefore, the grass 66 becomes less likely to enter the first cutout portion 57.

Figure 9:
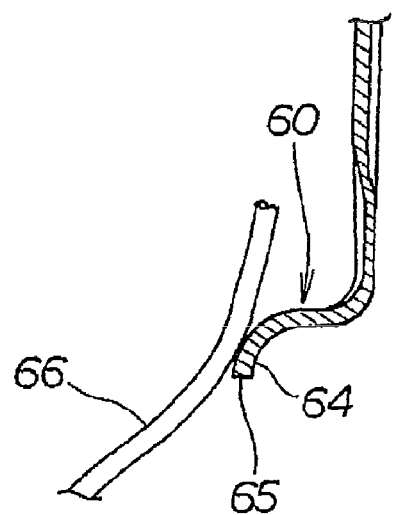
FIG. 9 is a sectional view taken along the line 9-9 of FIG. 8.

FIG. 9 is a sectional view taken along the line 9-9 of FIG. 8. The grass 66 is pushed by the bent portion 64, thereby avoiding injury to the grass 66. Also, a lower edge surface 65 of the bent portion 64 is kept horizontal. Since the grass 66 stands substantially erect on the ground, the horizontally provided lower edge surface 65 allows the grass 66 to be prevented from being cut.

Figure 10:
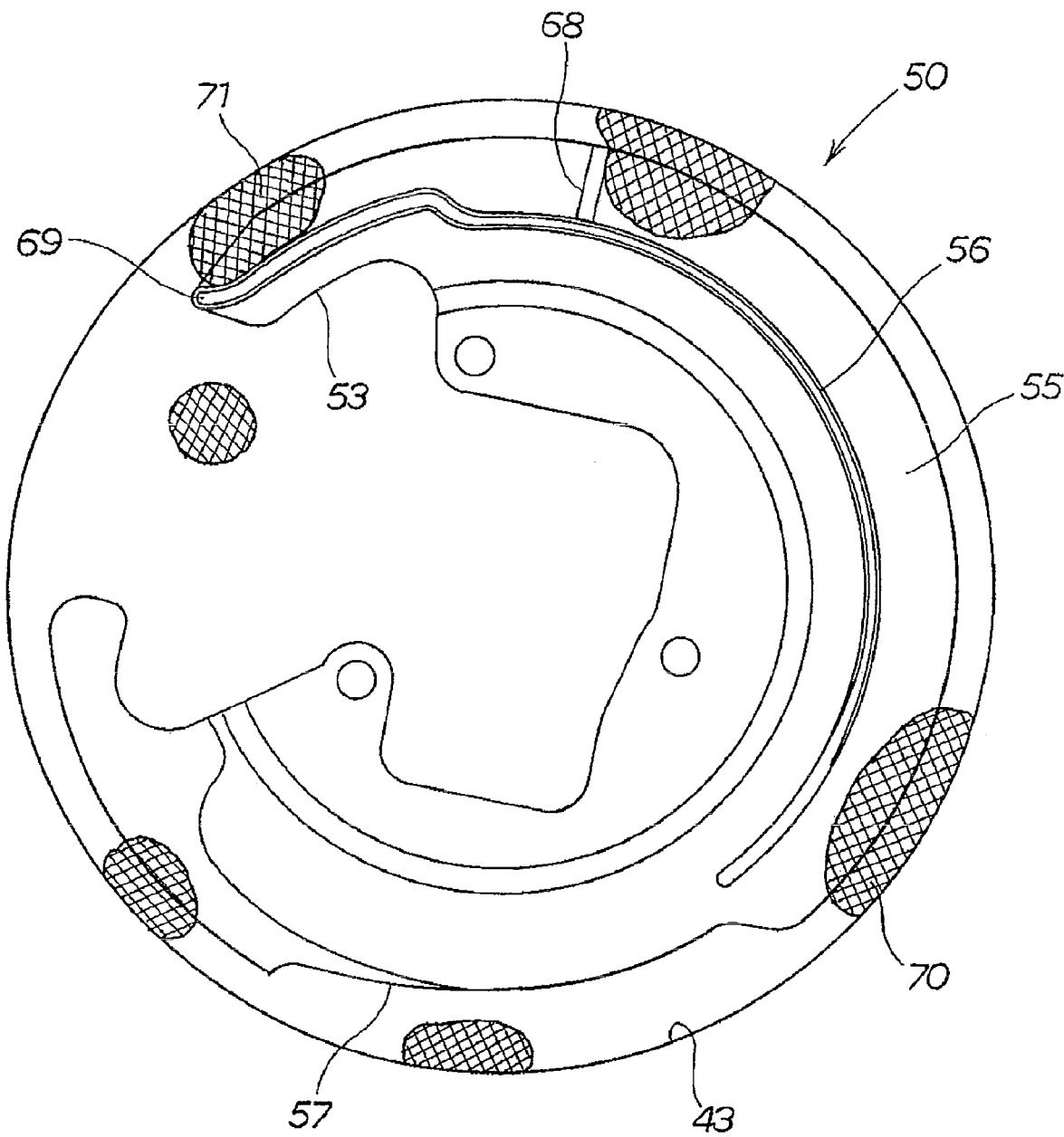
FIG. 10 is a rear view of the splash guard mechanism according to the present invention.

FIG. 10 is a rear view of the splash guard mechanism according to the present invention. When viewed from the vehicle-exterior side, the guide portion 56 extends about 180 degrees in the counterclockwise direction along the rim 43 from the vicinity of an edge, on the right of the drawing, of the first cutout portion 57. At an upper position on the guide portion 56, a triangular baffle plate 68 (baffle plate 68 shown by the imaginary line in FIG. 6) is provided between the guide portion 56 and the plate portion 55. Also, the front end of the guide portion 56 is a scraper 69, and the spacing between the rim 43 and the guide portion 56 becomes smaller by the scraper 69.

The rim 43 on which mud 70 is deposited, rotates in the counterclockwise direction along with the forward movement of the vehicle. On the other hand, the splash guard mechanism 50 does not rotate. The mud 70 is scraped off by the baffle plate 68 to fall down, and then is ejected from the first cutout portion 57 to the far side of the drawing. Remaining mud 71 passing over the baffle plate 68 is scraped off by the scraper 69 to fall down, and then is ejected from the first cutout portion 57 to the far side of the drawing.

Referring back to FIG. 3, the right side of the drawing is the vehicle front side, and the brake caliper 47 is disposed at the vehicle front side of the center (the same as the center of the axle) of the wheel 39. It is common that a rear upper portion of a tire is covered with a fender or the like, and a front portion thereof is open to thereby facilitate access from the outside. Since the brake caliper 47 is disposed at a front portion of the tire constructed in this manner, the removal of mud and gravel jammed in the brake caliper 47 can be further facilitated.

Also, the front end (the scraper 69 in FIG. 10) of the guide portion 56 is disposed above the second cutout portion 53, and the grass removal portion 60 is disposed below the second cutout portion 53. Since the front end of the guide portion 56 and the grass removal portion 60 are disposed in front of the tire, the removal of mud and gravel remaining therein without being ejected can be further facilitated.

Furthermore, the apex 61 of the grass removal portion 60 is disposed on the vehicle front side of the arm connectors 33 of the arms of the suspension. That is to say, the grass removal portion 60 is provided at such a position to avoid interference with the arms (upper arm 25 and lower arm 26 in FIG. 2) of the suspension, thereby allowing enlargement of the grass removal portion 60 and increasing flexibility in the shape design.

Also, in FIG. 2, the rim 43 is formed in a cone shape gently broadened toward the vehicle center. As compared with a cylindrically-shaped one, the cone-shaped rim 43 further facilitates the ejection of dirt (such as mud, gravel, and grass) having entered the concave portion 44 because the dirt spirals into a conic surface thereof when the rim 43 rotates. This ejection is performed by the first cutout portion (first cutout portion 57 in FIG. 3) provided on the far side in the drawing of the bent portion 64. Therefore, the bent portion 64 does not interfere with such ejection.

Meanwhile, since the bent portion 64 can be provided sufficiently close to the rim 43, the entry of mud and the like can be prevented. In addition, by providing the bent portion 64, the rigidity of the grass removal portion (grass removal portion 60 in FIG. 3) can be increased.

Figure 11:
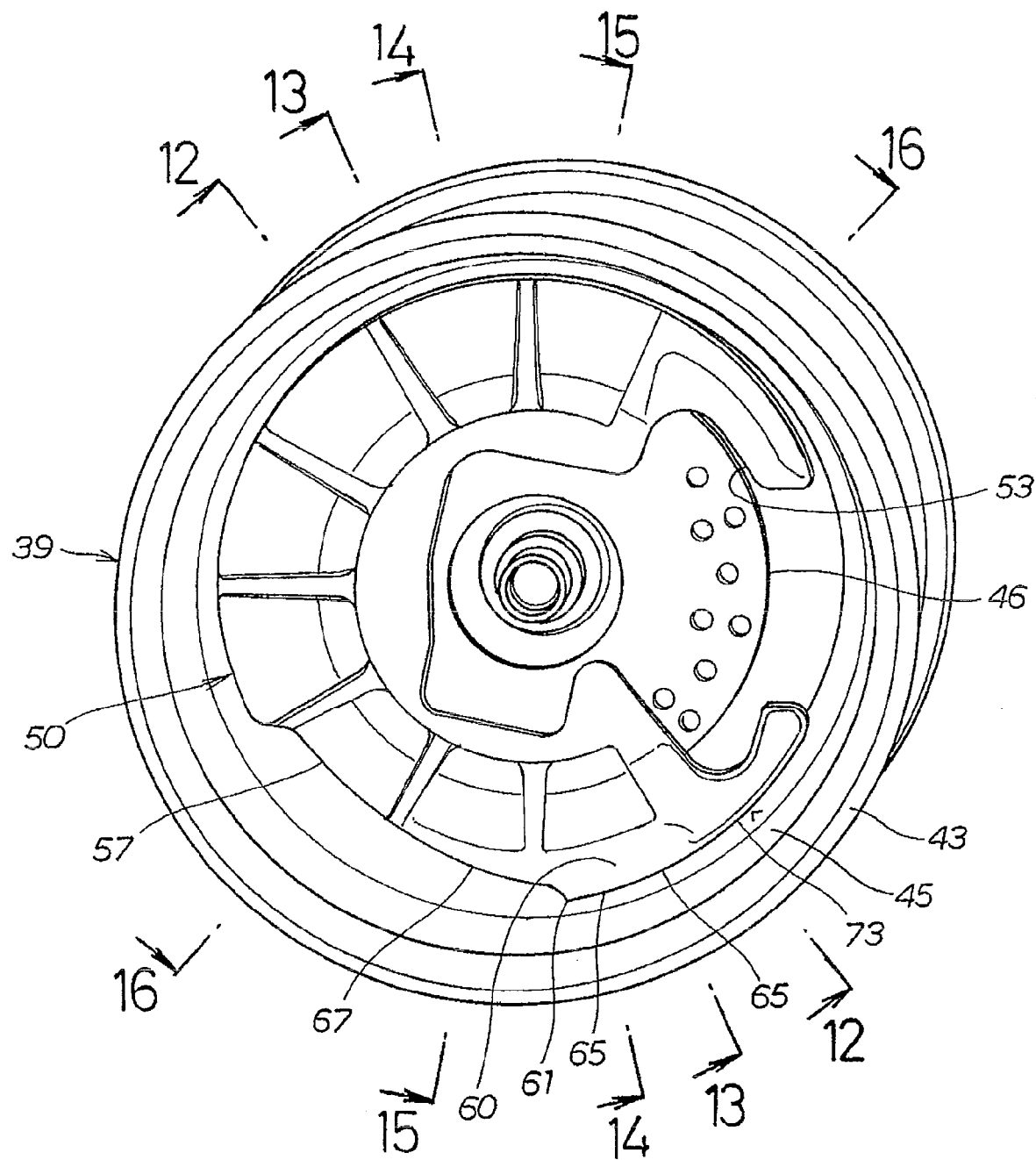
FIG. 11 is a perspective view with the splash guard mechanism mounted.

Next, a relative position between the rim 43 and the grass removal portion 60 will be further described in detail. As shown in FIG. 11, a lower edge 73 (particularly, the lower edge surface 65) of the grass removal portion 60 is formed along a bottom surface 45 of the rim 43, and its detailed description will be given with reference to FIGS. 12 to 16 showing sectional views of FIG. 11.

Figure 12:
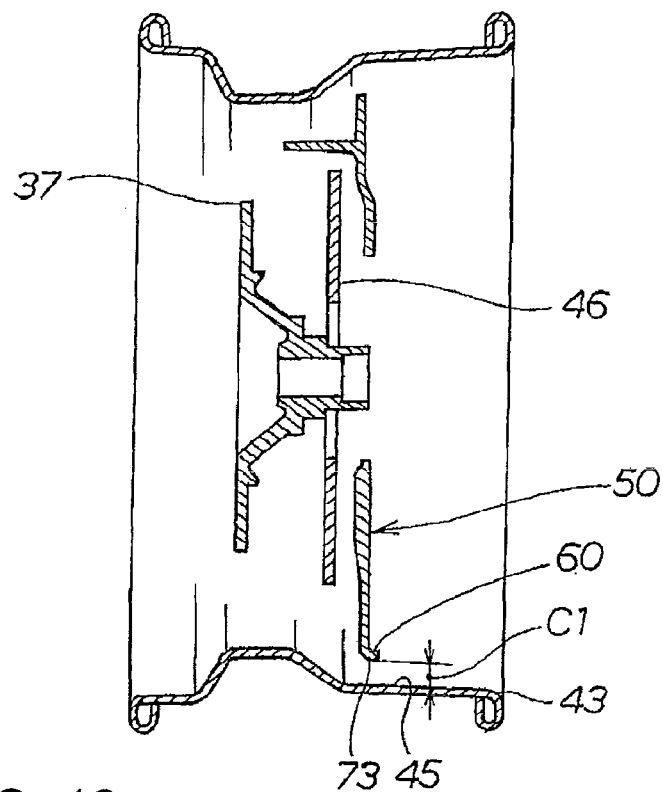
FIG. 12 is a sectional view taken along the line 12-12 of FIG. 11.
Figure 13:
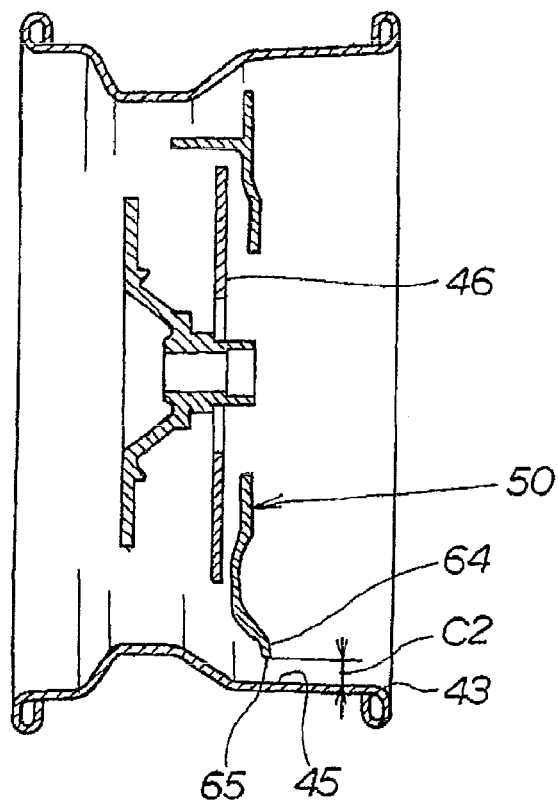
FIG. 13 is a sectional view taken along the line 13-13 of FIG. 11.
Figure 14:
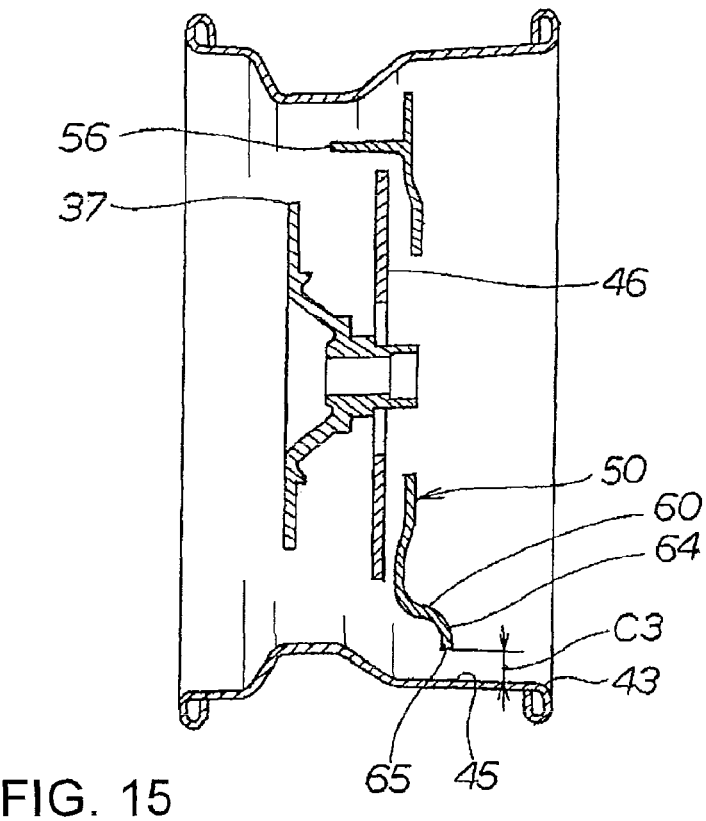
FIG. 14 is a sectional view taken along the line 14-14 of FIG. 11.

As shown in FIG. 12, a spacing C1 between the lower edge 73 of the grass removal portion 60 and the bottom surface 45 of the rim 43 is sufficiently small. As shown in FIGS. 13 and 14, spacings C2 and C3 between the lower edge surface 65 of the bent portion 64 and the bottom surface 45 of the rim 43 are sufficiently small. Since the spacings C1 to C3 are small, the entry of grass and gravel can be suppressed.

Figure 15:
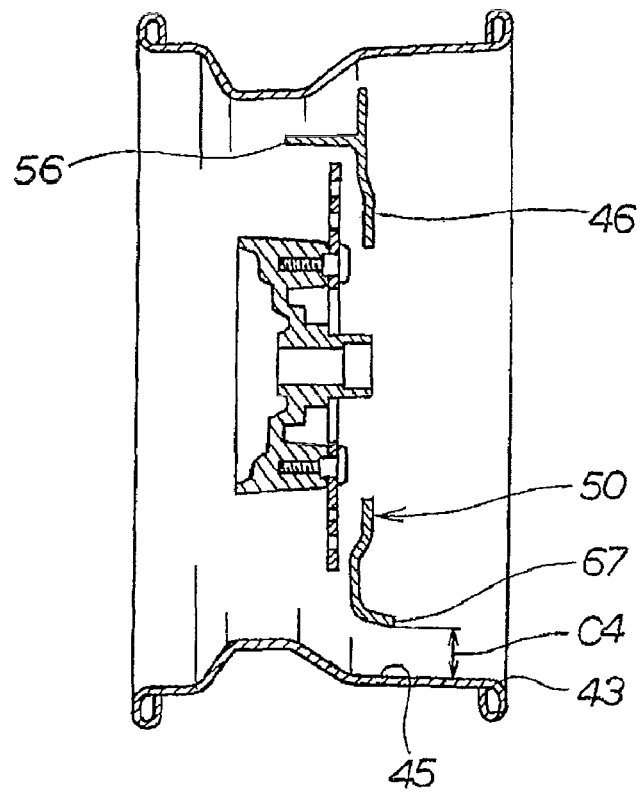
FIG. 15 is a sectional view taken along the line 15-15 of FIG. 11.
Figure 16:
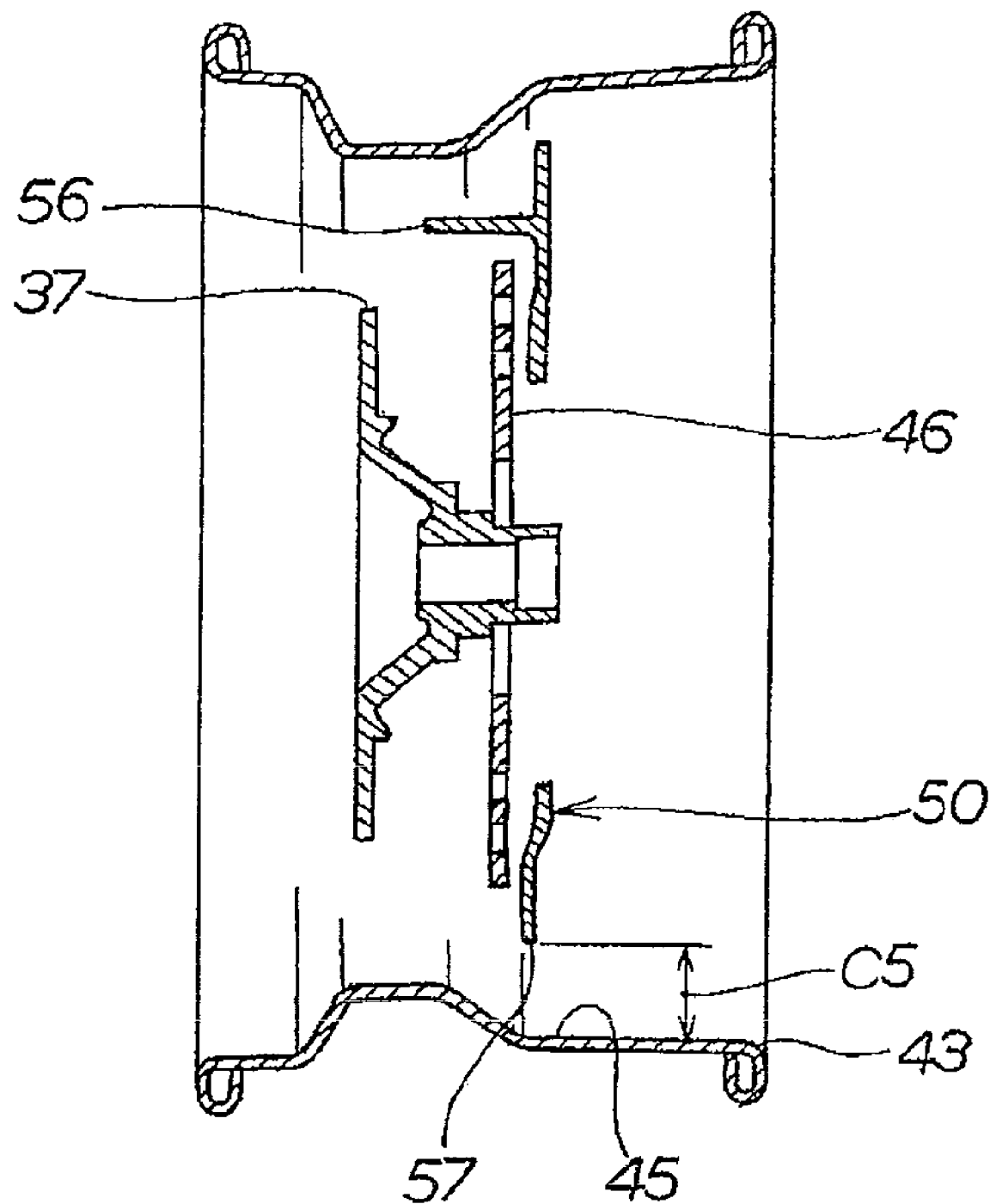
FIG. 16 is a sectional view taken along the line 16-16 of FIG. 11.

On the other hand, in FIG. 15 in which no bent portion 64 is provided, a spacing C4 between the rear oblique side 67 and the bottom surface 45 of the rim 43 is large. In the same manner, in FIG. 16 in which no bent portion 64 is provided, a spacing C5 between the first cutout portion 57 and the bottom surface 45 of the rim 43 is sufficiently large. Since the spacing C4 and C5 are large, the ejection of the entered grass, mud, and gravel can be effectively performed.

The splash guard mechanism according to the present invention is suitable for ATVs, however, may be used in normal vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A splash guard mechanism for a vehicle, mounted on a brake system stored in a concave portion provided on each wheel for preventing entry of mud from the outside into the brake system, the splash guard mechanism comprising:
a substantially disc-shaped plate portion covering the brake system to close the concave portion;
a first cutout portion formed by cutting out a lower portion of the plate portion; and
a grass removal portion extending from the plate portion toward a vehicle center,
wherein the grass removal portion is formed in a substantially triangular shape and includes an apex protruding toward the vehicle center in a plan view at the forward most part of the first cutout portion,
wherein the substantially triangular-shaped grass removal portion has a surface that extends in a direction that is substantially perpendicular to the plate portion, and the surface is bounded by:
a first side extending along a lower edge of the plate portion,
a rear oblique side extending obliquely rearwardly from the apex to a rear end of the first side and overlapping with a vehicle front portion of the first cutout portion, and
a front oblique side extending obliquely forward from the apex to a front end of the first side,
wherein a steep oblique portion having a sharp inclination is provided in the vicinity of the apex on the front oblique side of the substantially triangular shape, and a leading edge of the front oblique side is bent downwardly.

2. The splash guard mechanism for the vehicle according to claim 1, wherein the first side of the substantially triangular-shaped grass removal portion is longer than each of the front oblique side and the rear oblique side.

3. The splash guard mechanism for the vehicle according to claim 2, wherein the substantially disc-shaped plate portion includes a guide portion extending outwardly of the vehicle from the plate portion to guide mud deposited on a rim, and formed in a C-shape with a second cutout portion being disposed so as to face the vehicle front side and containing a brake caliper, and
wherein a front end of the guide portion is disposed above the second cutout portion, and the grass removal portion is disposed below the second cutout portion.

4. The splash guard mechanism for the vehicle according to claim 2, wherein the leading edge of the front oblique side which is bent downwardly extends to the vicinity of a rim, and a lower surface thereof is formed along a bottom surface of the rim.

5. The splash guard mechanism for the vehicle according to claim 1, wherein a knuckle is connected to the wheel through a wheel hub, and wherein, when arm connectors of a suspension are provided on the knuckle, the apex is disposed on a vehicle front side of the arm connectors.

6. The splash guard mechanism for the vehicle according to claim 1, wherein the substantially disc-shaped plate portion includes a guide portion extending outwardly of the vehicle from the plate portion to guide mud deposited on a rim, and formed in a C-shape with a second cutout portion being disposed so as to face the vehicle front side and containing a brake caliper, and
wherein a front end of the guide portion is disposed above the second cutout portion, and the grass removal portion is disposed below the second cutout portion.

7. The splash guard mechanism for the vehicle according to claim 1, wherein the leading edge of the front oblique side which is bent downwardly extends to the vicinity of a rim, and a lower surface thereof is formed along a bottom surface of the rim.

8. A splash guard mechanism adapted to be mounted relative to a brake system positioned in a concave portion of a wheel for preventing entry of mud from the outside into the brake system, comprising:
a substantially disc-shaped plate portion adapted for covering the brake system to form a substantial closure in the concave portion of the wheel;
a guide portion extending outwardly from the substantially disc-shaped plate portion;
a first cutout portion formed by cutting out a lower portion of the plate portion, said first cutout portion including a front portion and a rear portion;
said guide portion extending from adjacent to the brake system over a predetermined area to adjacent to the first cutout portion; and a grass removal portion extending inwardly from the plate portion, wherein the grass removal portion is formed in a substantially triangular shape and includes an apex protruding toward the vehicle center in a plan view at the forward most part of the first cutout portion, wherein the substantially triangular-shaped grass removal portion has a surface that extends in a direction that is substantially perpendicular to the plate portion, and the surface is bounded by:

a first side extending along a lower edge of the plate portion, a rear oblique side extending obliquely rearwardly from the apex to a rear end of the first side and overlapping with the front portion of the first cutout portion, and a front oblique side extending obliquely forward from the apex to a front end of the first side;

wherein a steep oblique portion having a sharp inclination is provided in the vicinity of the apex on the front oblique side of the substantially triangular shape, and a leading edge of the front oblique side is bent downwardly.

9. The splash guard mechanism adapted to be mounted relative to a brake system according to claim 8, wherein the first side of the substantially triangular-shaped grass removal portion is longer than each of the front oblique side and the rear oblique side.

10. The splash guard mechanism adapted to be mounted relative to a brake system according to claim 9, wherein the substantially disc-shaped plate portion includes a guide portion extending outwardly of the vehicle from the plate portion to guide mud deposited on a rim, and formed in a C-shape with a second cutout portion being disposed so as to face the vehicle front side and containing a brake caliper, and wherein a front end of the guide portion is disposed above the second cutout portion, and the grass removal portion is disposed below the second cutout portion.

11. The splash guard mechanism adapted to be mounted relative to a brake system according to claim 9, wherein the leading edge of the front oblique side which is bent downwardly extends to the vicinity of a rim, and a lower surface thereof is formed along a bottom surface of the rim.

12. The splash guard mechanism adapted to be mounted relative to a brake system according to claim 8, wherein a knuckle is connected to the wheel through a wheel hub, and wherein, when arm connectors of a suspension are provided on the knuckle, the apex is disposed on a vehicle front side of the arm connectors.

13. The splash guard mechanism adapted to be mounted relative to a brake system according to claim 8, wherein the substantially disc-shaped plate portion includes a guide portion extending outwardly of the vehicle from the plate portion to guide mud deposited on a rim, and formed in a C-shape with a second cutout portion being disposed so as to face the vehicle front side and containing a brake caliper, and wherein a front end of the guide portion is disposed above the second cutout portion, and the grass removal portion is disposed below the second cutout portion.

14. The splash guard mechanism adapted to be mounted relative to a brake system according to claim 8, wherein the leading edge of the front oblique side which is bent downwardly extends to the vicinity of a rim, and a lower surface thereof is formed along a bottom surface of the rim.

* * * * *